United States Patent
Ojima et al.

(10) Patent No.: US 11,052,945 B2
(45) Date of Patent: Jul. 6, 2021

(54) TOE ANGLE CONTROL SYSTEM FOR VEHICLE

(71) Applicant: HONDA MOTOR CO., LTD., Tokyo (JP)

(72) Inventors: Yosuke Ojima, Wako (JP); Kenichi Takishita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 298 days.

(21) Appl. No.: 16/269,053

(22) Filed: Feb. 6, 2019

(65) Prior Publication Data

US 2019/0283804 A1 Sep. 19, 2019

(30) Foreign Application Priority Data

Mar. 14, 2018 (JP) .............................. JP2018-046830

(51) Int. Cl.
*B62D 17/00* (2006.01)
*B62D 7/14* (2006.01)
(Continued)

(52) U.S. Cl.
CPC ........... *B62D 17/00* (2013.01); *B62D 5/0457* (2013.01); *B62D 7/146* (2013.01); *B62D 7/15* (2013.01);
(Continued)

(58) Field of Classification Search
CPC .......... B60G 2200/18; B60G 2200/462; B60G 3/20; B62D 17/00; B62D 5/0457;
(Continued)

(56) References Cited

U.S. PATENT DOCUMENTS 7,516,965 B2 * 4/2009 Horiuchi ................. B62D 6/02
280/5.52
7,871,085 B2 * 1/2011 Sasaki .................... B62D 7/159
280/5.524
(Continued)

FOREIGN PATENT DOCUMENTS

JP H1149011 A 2/1999
JP 2001010141 A 1/2001
(Continued)

OTHER PUBLICATIONS

English translation of Notice of Reasons for Refusal for JP Application No. 2018-046830, dated Oct. 1, 2019, 4 pages.
(Continued)

Primary Examiner — Tyler J Lee
(74) Attorney, Agent, or Firm — Armstrong Teasdale LLP

(57) ABSTRACT

A toe angle control system for a vehicle, includes: an actuator having an output part configured to receive a driving force of an electric motor via a gear transmission mechanism and to be displaced by the driving force such that a displacement of the output part varies a toe angle of a wheel; and a controller controlling the electric motor, wherein the controller is configured to calculate an operation quantity of the electric motor, and, when the controller determines that a current displacement direction of the output part and a displacement direction of the output part corresponding to the operation quantity are opposite to each other, the controller corrects the operation quantity to reduce the operation quantity.

7 Claims, 6 Drawing Sheets

(51) Int. Cl.
  *B62D 7/18* (2006.01)
  *B62D 7/15* (2006.01)
  *B62D 5/04* (2006.01)

(52) U.S. Cl.
  CPC .............. *B62D 7/159* (2013.01); *B62D 7/18* (2013.01); *B60G 2200/462* (2013.01)

(58) Field of Classification Search
  CPC .......... B62D 7/146; B62D 7/15; B62D 7/159; B62D 7/18
  See application file for complete search history.

(56) References Cited

U.S. PATENT DOCUMENTS

| | | | | |
|---|---|---|---|---|
| 8,051,942 | B2* | 11/2011 | Sasaki | B62D 7/146 |
| | | | | 180/410 |
| 8,433,478 | B2* | 4/2013 | Sasaki | B62D 7/159 |
| | | | | 701/41 |
| 8,567,552 | B2* | 10/2013 | Sugai | B62D 5/006 |
| | | | | 180/402 |
| 8,831,838 | B2* | 9/2014 | Yanagi | B62D 7/146 |
| | | | | 701/49 |
| 9,884,642 | B2 | 2/2018 | Takashima et al. | |
| 2001/0011201 | A1* | 8/2001 | Nishizaki | B62D 5/006 |
| | | | | 701/41 |
| 2008/0051941 | A1* | 2/2008 | Horiuchi | B62D 7/148 |
| | | | | 700/279 |
| 2008/0100021 | A1* | 5/2008 | Yamada | B60G 3/01 |
| | | | | 280/124.127 |
| 2008/0196966 | A1* | 8/2008 | Maruyama | B62D 17/00 |
| | | | | 180/446 |
| 2008/0243339 | A1* | 10/2008 | Nishimori | B60G 7/003 |
| | | | | 701/41 |
| 2009/0140502 | A1* | 6/2009 | Sasaki | B62D 17/00 |
| | | | | 280/5.522 |
| 2010/0231005 | A1* | 9/2010 | Yoshida | B62D 21/11 |
| | | | | 296/203.02 |
| 2011/0276231 | A1* | 11/2011 | Suzuki | B62D 5/001 |
| | | | | 701/42 |
| 2013/0320642 | A1 | 12/2013 | Hinohara et al. | |

FOREIGN PATENT DOCUMENTS

| | | |
|---|---|---|
| JP | 2004358985 A | 12/2004 |
| JP | 2010158994 A | 7/2010 |
| JP | 2010273194 A | 12/2010 |
| JP | 2013248896 A | 12/2013 |
| WO | 2013088502 A1 | 4/2015 |

OTHER PUBLICATIONS

English translation of Notice of Reasons for Refusal for JP Application No. 2018-046830, dated Dec. 3, 2019, 5 pages.

* cited by examiner

TOE ANGLE CONTROL SYSTEM FOR VEHICLE

TECHNICAL FIELD

The present invention relates to a toe angle control system for a vehicle, and in particular to a technology for reducing rattling sound of an actuator for varying the toe angle.

BACKGROUND ART

Some four-wheel vehicles have a rear wheel toe angle control system in addition to a front wheel steering system, where the front wheel steering system is configured to steer the left and right front wheels according to a rotational operation of a steering wheel by a driver, and the rear wheel toe angle control system is configured to variably control the toe angles of the left and right rear wheels according to a front wheel steering amount and a vehicle speed (see JP2013-248896A, for example). The rear wheel toe angle control system includes an actuator for each rear wheel, such that the actuator connects the knuckle for the corresponding rear wheel to the vehicle body. Each actuator includes an output shaft supported so as to be capable of advancing and retreating relative to the case, and an electric motor that drives the output shaft via a gear transmission mechanism. The electric motor is controlled by an electric control unit (ECU) to cause the output shaft of the actuator to advance and retreat relative to the case. Namely, the actuator is caused to expand and contract between the vehicle body and the knuckle to vary the toe angle of the corresponding rear wheel.

The gear transmission mechanism of the actuator has a backlash between meshing gears. Therefore, when the electric motor is driven, collision of teeth of the gears can produce a rattling sound (tooth hitting noise). It may be conceivable to lower the rattling sound by reducing the backlash, but this would require a higher manufacturing precision of the gears, and hence, would result in a higher manufacturing cost. Thus, there is a demand for a novel toe angle control system for a vehicle that can reduce the rattling sound without an increase in the manufacturing cost.

SUMMARY OF THE INVENTION

In view of the foregoing background, a primary object of the present invention is to provide toe angle control system for a vehicle which can reduce rattling sound.

Means to Accomplish the Task

To achieve the above object, one embodiment of the present invention provides a toe angle control system for a vehicle, comprising: an actuator (24) having an output part (29) configured to receive a driving force of an electric motor (28) via a gear transmission mechanism (30) and to be displaced by the driving force such that a displacement of the output part varies a toe angle of a wheel; and a controller (55) controlling the electric motor, wherein the controller is configured to calculate an operation quantity of the electric motor, and, when the controller determines that a current displacement direction of the output part and a displacement direction of the output part corresponding to the operation quantity are opposite to each other, the controller corrects the operation quantity to reduce the operation quantity.

According to this arrangement, when the current displacement direction of the output part and the displacement direction of the output part corresponding to the operation quantity of the electric motor are opposite to each other, namely, the abutment direction of the mating gears of the gear transmission mechanism changes and collision of the teeth of the mating gears occurs, the controller corrects the operation quantity to reduce the operation quantity to thereby suppress increase of the rotation speed of the electric motor in the reverse direction. Thereby, it is ensured that there is a time period sufficient for the displacement speed of the output part to be reduced before the teeth of the mating gears collide against each other. Consequently, when the teeth of the mating gears collide against each other, the relative speed between the mating gears becomes small, and this decreases the kinetic energy. Therefore, the rattling sound (tooth hitting noise) generated by the collision between the gears can be suppressed.

In the above arrangement, preferably, the toe angle control system further comprises a sensor (48) configured to detect a state quantity related to a position of the output part, wherein the controller is configured to obtain the current displacement direction of the output part based on a signal from the sensor, and when the current displacement direction of the output part and the displacement direction of the output part corresponding to the operation quantity are opposite to each other, to correct the operation quantity of the electric motor to reduce the operation quantity.

According to this arrangement, it is possible to obtain the displacement direction of the output part based on the signal from the sensor, and to detect more reliably when the current displacement direction of the output part and the displacement direction of the output part corresponding to the operation quantity are opposite to each other.

In the above arrangement, preferably, the toe angle control system further comprises a vehicle speed sensor (56) configured to detect a vehicle speed, wherein the lower the vehicle speed is, the more the controller reduces the operation quantity when correcting the operation quantity.

According to this arrangement, it is possible to increase the amount of reduction of the operation quantity when the vehicle speed is low, to thereby suppress the rattling sound even more reliably. When the vehicle speed is low, even if the displacement speed of the output part (and hence, the response speed of the toe angle control system) is low, it has only a small influence on the driving performance. In addition, when the vehicle speed is low, the traveling sound (road noise) of the vehicle is low, and therefore, the rattling sound can be easily perceived by the vehicle occupant. On the other hand, when the vehicle speed is high, it is preferred that the displacement speed of the output part (and hence, the response speed of the toe angle control system) is high in view of the driving performance. In addition, when the vehicle speed is high, the traveling sound of the vehicle is large, and therefore, the rattling sound is perceived by the vehicle occupant less easily.

In the above arrangement, preferably, if the vehicle speed is equal to or lower than a predetermined determination value, the controller sets the operation quantity of the electric motor to zero when correcting the operation quantity.

According to this arrangement, it is possible to increase the amount of reduction of the operation quantity when the vehicle speed is low, to thereby suppress the rattling sound even more reliably.

In the above arrangement, preferably, the controller calculates the operation quantity by feedback control based on a difference between a current position and a target position of the output part. Also preferably, the operation quantity is a duty ratio of the electric motor.

In the above arrangement, preferably, the duty ratio may have positive and negative values, and the controller determines the displacement direction of the output part corresponding to the operation quantity based on a sign of the duty ratio.

According to this arrangement, the displacement direction of the output part corresponding to the operation quantity can be determined easily based on the duty ratio.

In the above arrangement, preferably, the actuator is supported on a sprung structure of a vehicle body.

According to this arrangement, it is possible to reduce the unsprung mass and to thereby improve the driving performance. In this toe angle control system, the rattling sound is suppressed, and thus, even when the toe angle control system is provided on a sprung structure located close to the passenger compartment, the rattling sound is not perceived by the vehicle occupant easily.

In the above arrangement, preferably, the sensor is configured to detect a position of at least one of the output part, a knuckle connected to the output part, and a wheel supported by the knuckle.

According to this arrangement, the speed of the output part can be calculated from the position information of the output part, knuckle, or wheel.

According to the foregoing arrangement, a toe angle control system for a vehicle that can reduce rattling sound can be provided.

DESCRIPTION OF THE PREFERRED EMBODIMENT(S)

In the following, an embodiment of a toe angle control system for a vehicle according to the present invention will be described with reference to the appended drawings. In the following description, the directions are defined with respect to the vehicle body to which the toe angle control system is mounted.

Figure 1:
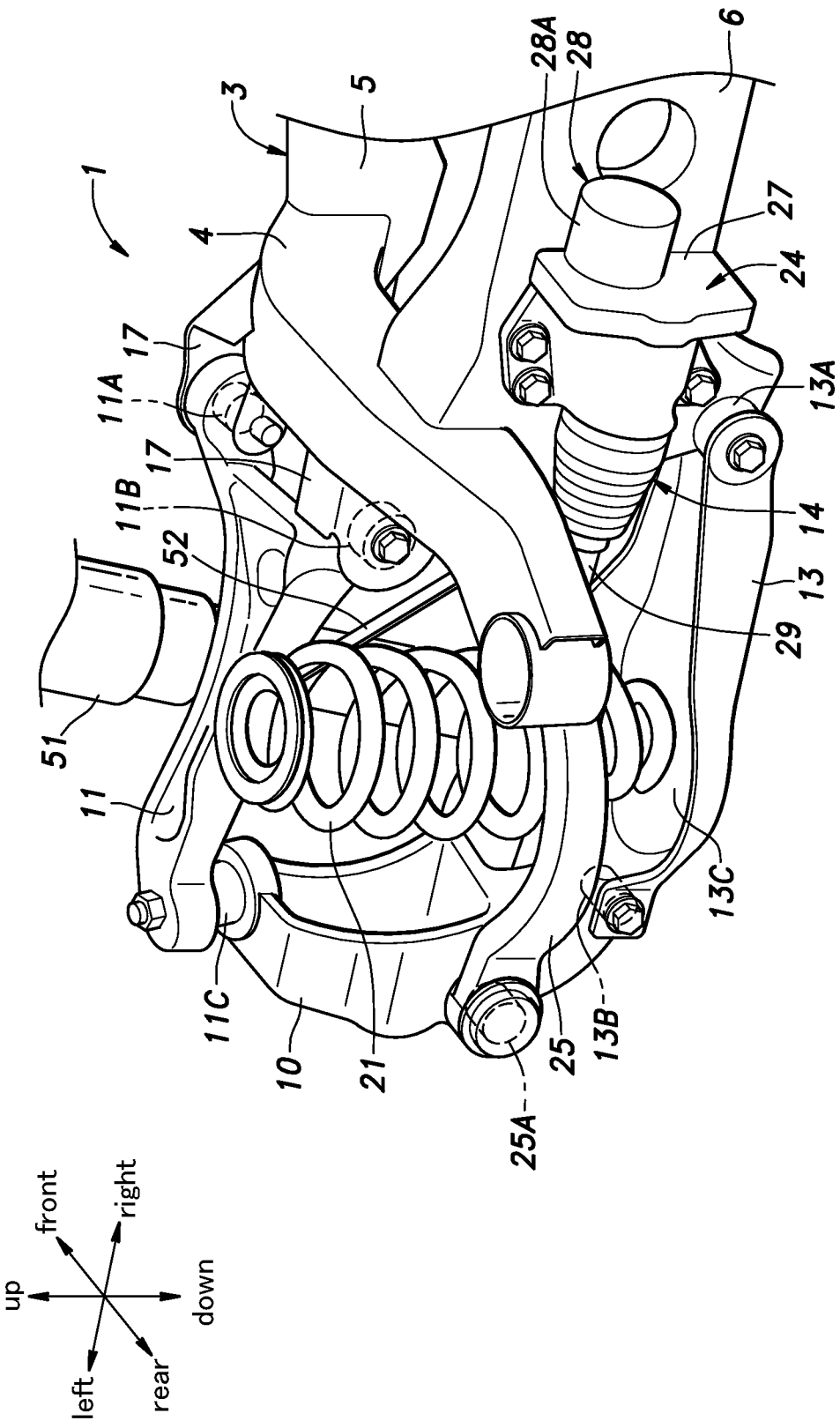
FIG. 1 is a perspective view of a left rear wheel suspension provided with a toe angle control system according to an embodiment of the present invention.
Figure 2:
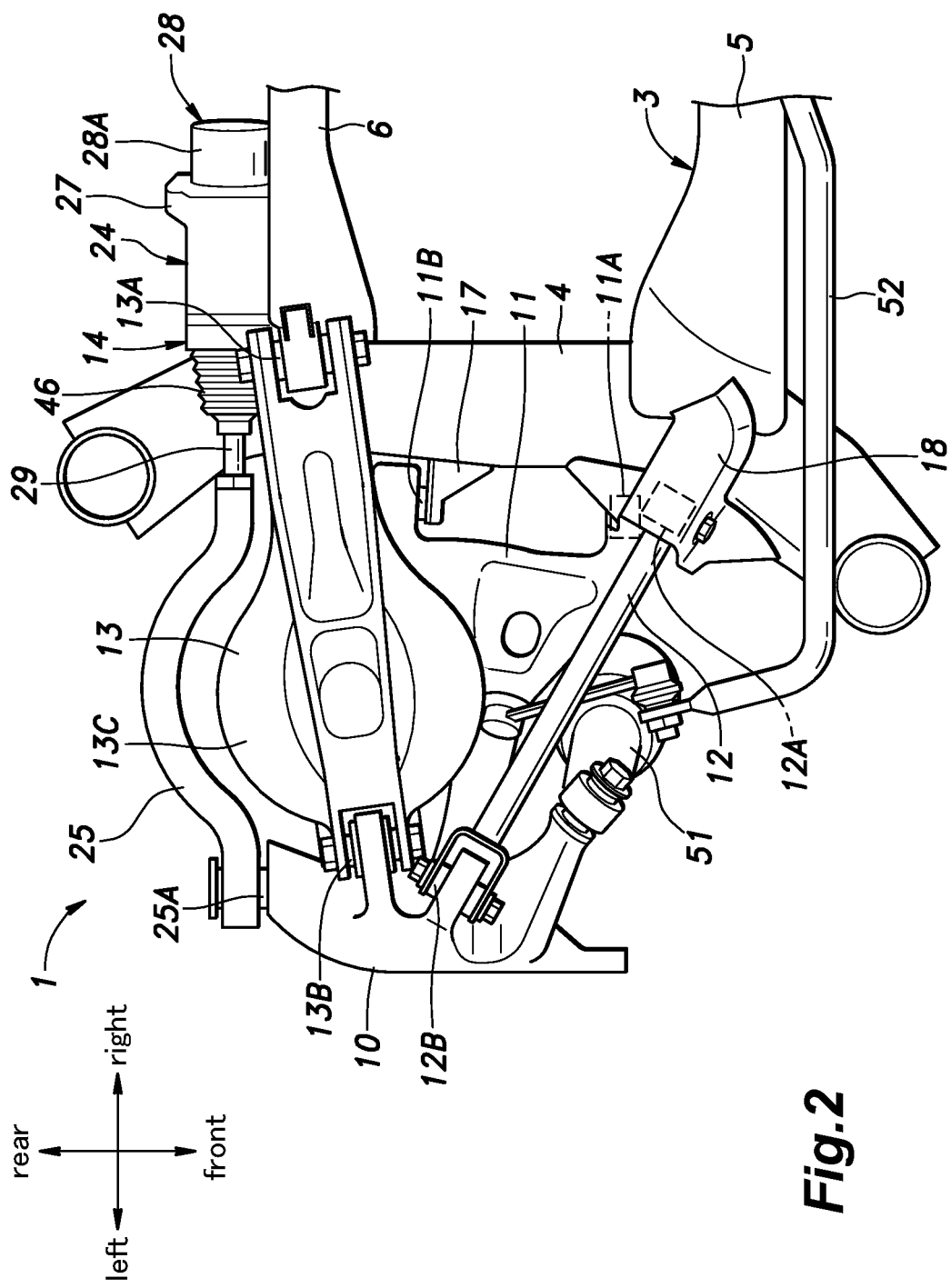
FIG. 2 is a bottom view of the toe angle control system according to the embodiment.

As shown in FIGS. 1 and 2, a rear wheel suspension system 1 is a multi-link suspension, and is provided on a rear subframe 3, which in turn is attached to a vehicle body (not shown in the drawings). The illustrated rear wheel suspension system 1 is for the left rear wheel, and another rear wheel suspension system 1 for the right rear wheel is also provided on the rear subframe 3. The left and right rear wheel suspension systems 1 are symmetric in structure, and therefore, the following description will be mainly made of the left rear wheel suspension system 1.

The rear subframe 3 includes a pair of left and right side members 4 each extending in a fore and aft direction, a front cross member 5 extending laterally to have both ends joined to the respective side members 4, and a rear cross member 6 extending laterally behind the front cross member 5 to have both ends joined to the respective side members 4. Each of the left and right side members 4 is connected to the vehicle body at front and rear ends thereof via rubber bushings. The vehicle body includes a pair of left and right rear frames (not shown in the drawings) each extending in the fore and aft direction, and the left and right side members 4 are preferably connected to the corresponding rear frames. The rear cross member 6 has a vertical dimension such that an upper end of the rear cross member 6 is joined to the left and right side members 4. The rear subframe 3 constitutes a sprung structure.

The suspension system 1 includes a knuckle 10, an upper arm 11, a front lower arm 12, a rear lower arm 13, and a toe angle control system 14. The knuckle 10 rotatably supports a wheel. The upper arm 11, front lower arm 12, rear lower arm 13, and toe angle control system 14 connect the knuckle 10 to the rear subframe 3. The upper arm 11 consists of an A-arm, and has two base ends (inner ends) respectively connected via rubber bushings 11A, 11B to a bracket 17 mounted on an upper part of the side member 4, and a tip end (outer end) connected via a rubber bushing 11C to an upper end part of the knuckle 10. The rubber bushings 11A, 11B provided on the base ends of the upper arm 11 each have a rotation axis extending substantially in the fore and aft direction, while the rubber bushing 11C provided on the tip end of the upper arm 11 has a rotation axis extending substantially in the vertical direction.

The front lower arm 12 consists of an I-arm, and has a base end connected via a rubber bushing 12A to a bracket 18 mounted on a lower surface of the side member 4, and a tip end connected via a rubber bushing 12B to a lower end part of the knuckle 10. The rubber bushings 12A, 12B respectively provided on the base end and the tip end of the front lower arm 12 each have a rotation axis extending obliquely leftward in the forward direction.

The rear lower arm 13 consists of an I-arm, and has a base end connected via a rubber bushing 13A to a lower part of a left end of the rear cross member 6, and a tip end connected via a rubber bushing 13B to a lower end part of the knuckle 10. The rubber bushings 13A, 13B respectively provided on the base end and the tip end of the rear lower arm 13 each have a rotation axis extending substantially in the fore and aft direction. Provided in a lengthwise intermediate portion of the rear lower arm 13 is a disk-shaped spring seat 13C having a surface facing upward. A compression coil spring 21 is provided between the spring seat 13C and the vehicle body so as to extend substantially vertically.

Figure 3:
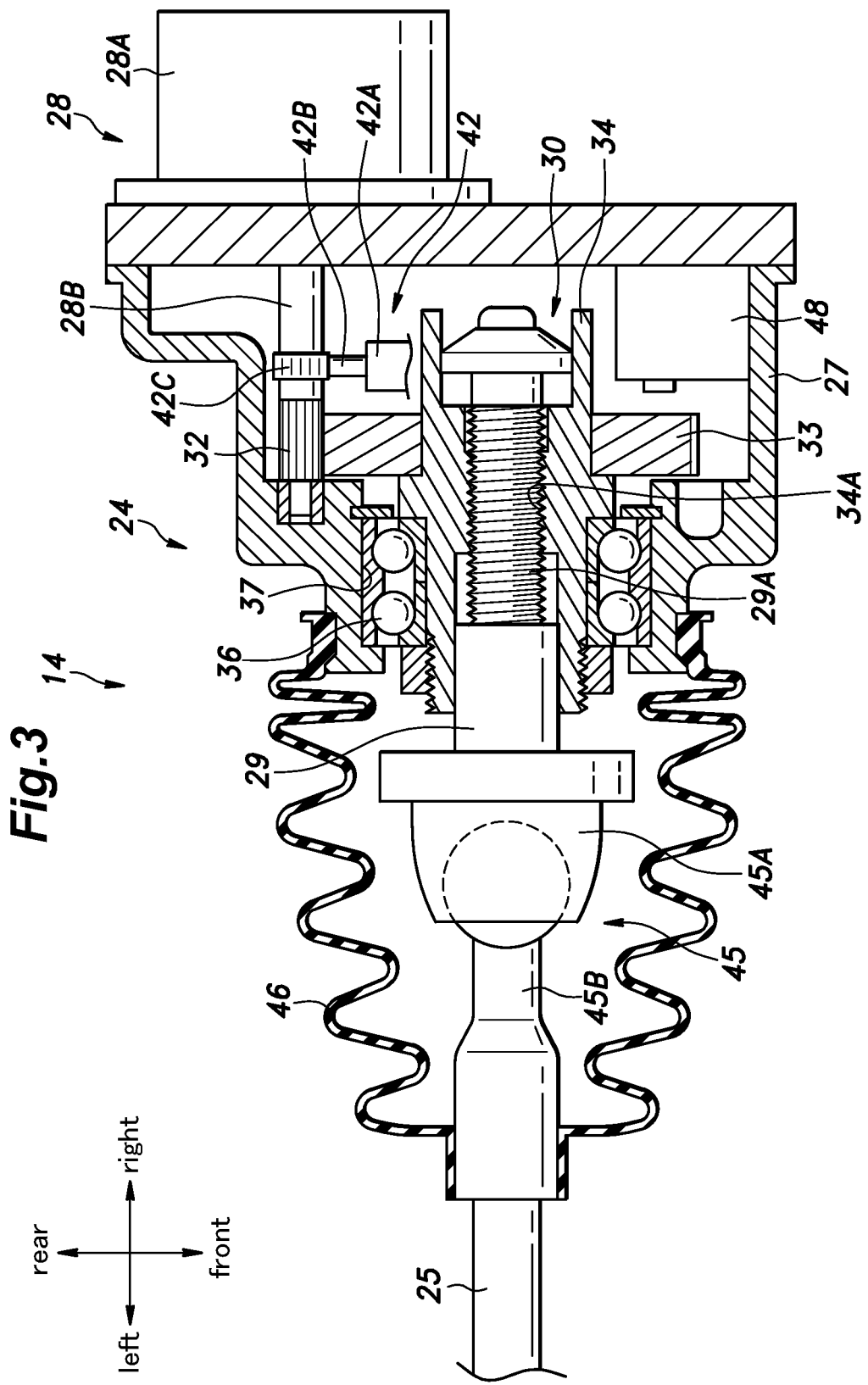
FIG. 3 is a sectional view of an actuator of the toe angle control system according to the embodiment.

The toe angle control system 14 includes an actuator 24 capable of expanding and contracting and a connecting rod 25 connecting the actuator 24 and the knuckle 10 to each other. As shown in FIG. 3, the actuator 24 includes a housing 27 constituting an outer shell of the toe angle control system 14, an electric motor 28 supported by the housing 27, an output shaft 29 (output part) supported so as to be capable of advancing and retreating relative to the housing 27, and a gear transmission mechanism 30 provided inside the housing 27 to transmit a driving force of the electric motor 28 to the output shaft 29. The housing 27 is fastened to a rear surface of the rear cross member 6.

A motor case 28A, which constitutes an outer shell of the electric motor 28, is mounted to a right end outer surface of the housing 27. The electric motor 28 has a motor output shaft 28B extending leftward from the motor case 28A into an interior of the housing 27 and provided with a drive gear 32 at a tip end thereof. A driven gear 33 meshing with the drive gear 32 is provided inside the housing 27. The drive gear 32 and the driven gear 33 each may be a helical gear or a spur gear, and are arranged in parallel to each other. At the center of the driven gear 33, a cylindrical nut 34 extending in an axial direction is integrally connected to the driven gear 33. Thus, the nut 34 rotates integrally with the driven gear 33. The nut 34 is rotatably supported in a bearing hole 37 of the housing 27 via a bearing 36. The bearing 36 may consist of an angular ball bearing, for example. The bearing hole 37 opens on an outer surface of the housing 27.

The nut 34 has open ends, and is provided with a female thread 34A on an inner circumferential surface thereof. The output shaft 29 is provided with a male thread 29A on an outer circumferential surface thereof and is inserted in the nut 34 such that the male thread 29A meshes with the female thread 34A. Rotation of the output shaft 29 relative to the housing 27 is restrained, and therefore, when the nut 34 is caused to rotate relative to the housing 27, the output shaft 29 advances or retreats in the axial direction. Thus, the drive gear 32, the driven gear 33, the female thread 34A of the nut 34, and the male thread 29A of the output shaft 29 constitute the gear transmission mechanism 30 that converts the rotation of the electric motor 28 into axial movement (advancing and retreating) of the output shaft 29.

The housing 27 is provided with a locking device 42 for selectively locking rotation of the motor output shaft 28B. The locking device 42 includes a lock pin 42B caused to advance and retreat by a solenoid 42A, and a lock engagement portion 42C provided on the motor output shaft 28B. The lock engagement portion 42C includes multiple projections arranged in the circumferential direction of the motor output shaft 28B. The lock pin 42B can advance and retreat in the radial direction of the motor output shaft 28B to move between a lock position where the tip end of the lock pin 42B engages with the lock engagement portion 42C and a release position where the tip end is spaced radially outward from the lock engagement portion 42C.

An outer end of the output shaft 29 is connected to one end of the connecting rod 25 via a ball joint 45. The ball joint 45 includes a socket 45A provided at the outer end of the output shaft 29 and a ball stud 45B provided on the one end of the connecting rod 25 and having a spherical part received in the socket 45A. Around a part of the output shaft 29 projecting out from the housing 27 is provided a bellows-like boot 46. The boot 46 has one end connected to a base portion of the ball stud 45B and the other end connected to a periphery of the bearing hole 37 of the housing 27.

The other end of the connecting rod 25 is connected to a rear end part of the knuckle 10 via a bushing 25A. The bushing 25A provided on the other end of the connecting rod 25 has a rotation axis extending in the fore and aft direction. A lengthwise intermediate portion of the connecting rod 25 is curved rearward in an arc shape to avoid interference with the compression coil spring 21.

Further, the suspension system 1 is provided with a sensor configured to detect a state quantity related to the position of the output shaft 29. In the present embodiment, the sensor consists of a gear angle sensor 48 detecting the rotation angle of the driven gear 33 though the sensor may consist of any other suitable sensor or sensors such as a stroke sensor detecting the advance/retreat position of the output shaft 29 and a toe angle sensor detecting the rear wheel toe angle, for example. The gear angle sensor 48 may consist of a rotary encoder or a resolver, for example, and preferably is of an absolute type that can detect an absolute angle of the driven gear 33. There is a certain relationship between the rotation angle of the driven gear 33 and the position of the output shaft 29, and thus, once the rotation angle of the driven gear 33 is determined, the position of the output shaft 29 can be determined.

When the motor output shaft 28B rotates, the nut 34 also rotates owing to the drive gear 32 and the driven gear 33, whereby the output shaft 29 advances or retreats in the axial direction. With regard to the advancing/retreating movement of the output shaft 29, a direction in which the output shaft 29 projects from the housing 27 is referred to as an expansion direction ("+" direction), and a direction in which the output shaft 29 retreats into the housing 27 is referred to as a contraction direction ("−" direction). As the output shaft 29 moves in the expansion direction or contraction direction, the actuator 24 expands or contracts so that the entire length of the toe angle control system 14 expands or contracts. Specifically, when the output shaft 29 is moved in the expansion direction from the neutral position so that the position of the output shaft 29 is on the expansion side relative to the neutral position and the toe angle control system 14 expands, a rear part of the knuckle 10 is pushed by the toe angle control system 14 in an outboard direction so that the wheel toes in, and when the output shaft 29 moves in the contraction direction from the neutral position so that the position of the output shaft 29 is on the contraction side relative to the neutral position and the toe angle control system 14 contracts, the rear part of the knuckle 10 is pulled by the toe angle control system 14 in an inboard direction so that the wheel toes out. When the toe angle of the knuckle 10 changes, the associated rubber bushings deform, and the geometry of the upper arm 11, the front lower arm 12, the rear lower arm 13, and the toe angle control system 14 changes.

In addition, the suspension system 1 includes a shock absorber 51 connecting a front part of a lower end of the knuckle 10 to the vehicle body, and the upper arms 11 of the left and right suspension systems 1 are connected to each other by a stabilizer 52.

Figure 4:
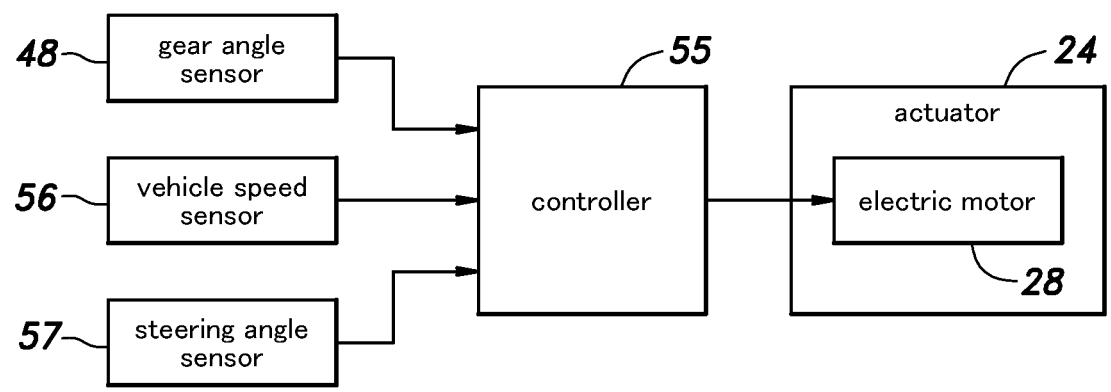
FIG. 4 is a functional block diagram of the toe angle control system according to the embodiment.

As shown in FIG. 4, the vehicle is provided with a controller 55 for controlling the electric motor 28. The controller 55 consists of an electronic control unit (ECU) constituted of a microcomputer, a ROM, a RAM, a peripheral circuit, an input/output interface, a motor driver, etc. The controller 55 drives the electric motor 28 via PWM control. Signals from the gear angle sensor 48, a vehicle speed sensor 56 that detects the speed of the vehicle, and a steering angle sensor 57 that detects a steering angle, which is a rotation angle of the steering wheel, are input to the controller 55.

Figure 5:
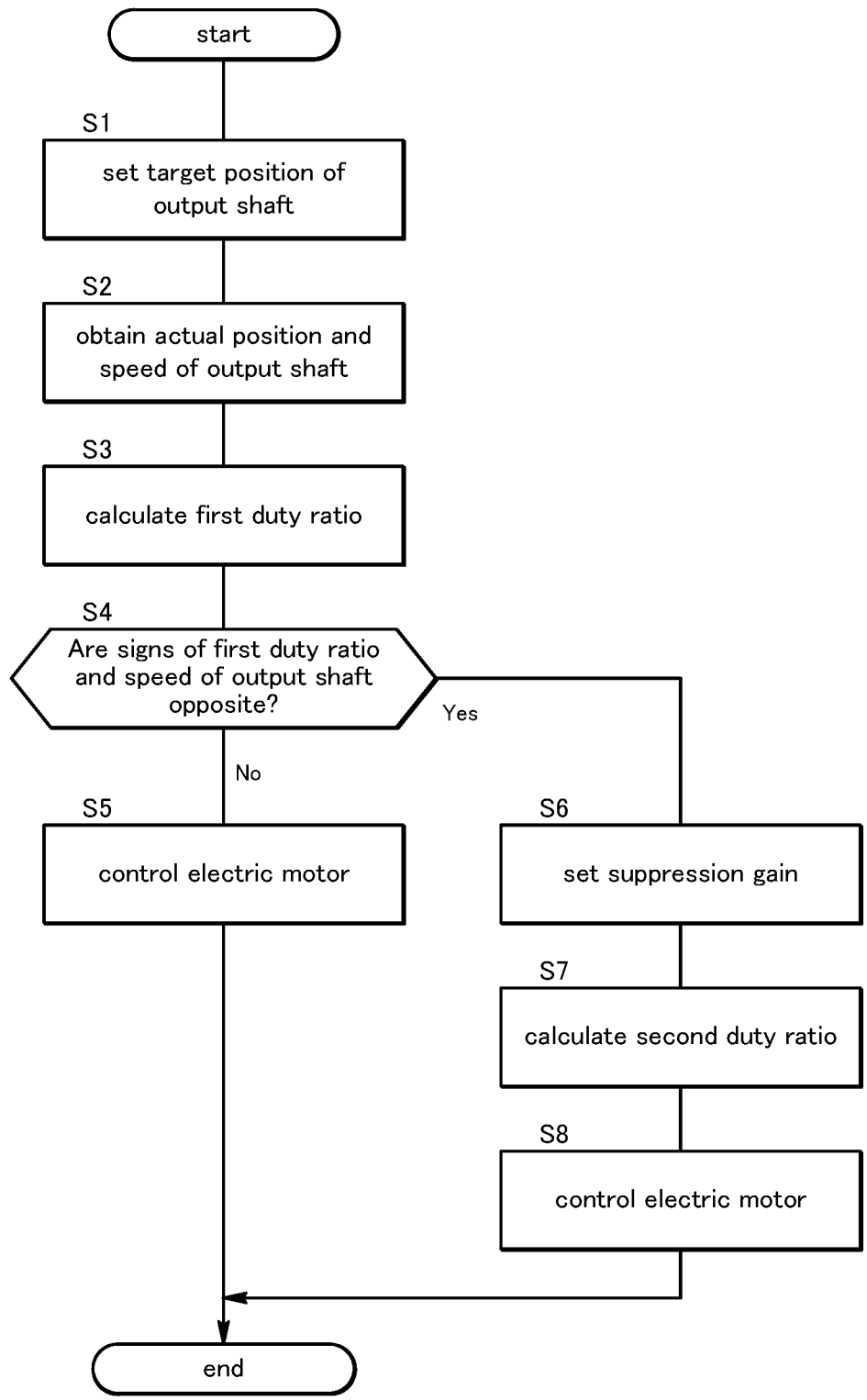
FIG. 5 is a control flow diagram for the actuator of the toe angle control system according to the embodiment; and (A) of FIG. 6 is a graph showing a relationship between a target position and an actual position of an output shaft, (B) of FIG. 6 is a graph showing a duty ratio and an actual position in a toe angle control system of a comparative example, and (C) of FIG. 6 is a graph showing a duty ratio and an actual position in the toe angle control system according to the embodiment.

The controller 55 controls the electric motor 28 in accordance with a flow shown in FIG. 5. First, the controller 55 sets a target position (commanded position) of the output shaft 29 based on the steering angle and the vehicle speed (S1). For example, the target position is set based on a map defining a relationship between the steering angle, the vehicle speed, and the target position. The position of the output shaft 29 has a certain relationship with the toe angle of the rear wheel, and the target position has a certain relationship with a target toe angle. The map is preferably formed to define the relationship between the steering angle, the vehicle speed, and the target position such that when the vehicle speed is equal to or higher than a predetermined threshold value, the target position (and hence the target toe angle) is set to cause the rear wheel to be steered in the same phase as the front wheel, while when the vehicle speed is lower than the predetermined threshold value, the target position (and hence the target toe angle) is set to cause the rear wheel to be steered in the reverse phase with respect to the front wheel.

Then, based on the signal from the gear angle sensor 48, the controller 55 obtains an actual position (or current position) of the output shaft 29 and a speed of the output shaft 29 (S2). Since the current rotation angle of the driven gear 33 obtained by the gear angle sensor 48 has a certain relationship with the actual position of the output shaft 29, it is possible to obtain the actual position of the output shaft 29 based on the signal from the gear angle sensor 48. Further, the controller 55 obtains the speed of the output shaft 29 by time-differentiating the actual position of the output shaft 29. The speed of the output shaft 29 can have positive and negative values, in that the speed of the output shaft 29 has a positive value when the output shaft 29 is moving in the expansion direction, and a negative value when the output shaft 29 is moving in the contraction direction.

Subsequently, based on a difference between the actual position and the target position of the output shaft 29, the controller 55 sets a first duty ratio, which is an operation quantity of the electric motor 28 (S3). Specifically, the controller 55 sets the first duty ratio by feedback control based on the position of the output shaft 29 (namely, the controller 55 sets the first duty ratio so as to feedback control the actual position of the output shaft such that the difference between the actual position and the target position of the output shaft 29 is reduced). The first duty ratio can have positive and negative values, in that the first duty ratio has a positive value when the electric motor 28 is caused to rotate in a direction of rotation corresponding to the expansion direction of the output shaft 29, and a negative value when the electric motor 28 is caused to rotate in a direction of rotation corresponding to the contraction direction of the output shaft 29. The first duty ratio can be set according to any appropriate method; for example, the first duty ratio may be varied to increase and decrease linearly or in a curved fashion.

Then, the controller 55 determines whether the sign of the first duty ratio and the sign of the speed of the output shaft 29 are opposite to each other (S4). Namely, the controller 55 determines whether the current displacement direction of the output shaft 29 and the displacement direction of the output shaft 29 corresponding to the first duty ratio (operation quantity) are opposite to each other. If the result of determination in step S4 is No, the controller 55 drives the electric motor 28 in accordance with the first duty ratio (S5), and thereafter returns to the start.

If the result of determination in step S4 is Yes, the controller 55 calculates a suppression gain based on the vehicle speed (S6). The suppression gain is used to correct the first duty ratio to reduce the operation quantity of the electric motor 28. The suppression gain can be a value equal to or greater than 0 and less than 1. The suppression gain is set to a first value when the vehicle speed is equal to or lower than a predetermined determination value, and to a second value, which is larger than the first value, when the vehicle speed is higher than the determination value. The first value can be a value equal to or greater than 0 and less than 1, and in the present embodiment, the first value is 0. The second value can be a value greater than 0 and less than 1, and in the present embodiment, the second value is 0.2.

Subsequently, the controller 55 multiplies the first duty ratio by the suppression gain to calculate a second duty ratio (S7). Namely, the controller 55 corrects the first duty ratio using the suppression gain (the corrected first duty ratio is referred to as the second duty ratio). Then, the controller 55 drives the electric motor 28 in accordance with the second duty ratio (S8), and thereafter returns to the start.

The effects and advantages of the toe angle control system 14 configured as above will be explained in the following in comparison with a toe angle control system according to a comparative example. In the toe angle control system according to the comparative example, only the feedback control based on the difference between the target position and the actual position of the output shaft 29 is performed, and the correction using the suppression gain according to the present embodiment is not performed. Namely, the control flow of the toe angle control system according to the comparative example does not include steps S4, S6, S7, and S8 of the control flow shown in FIG. 5, such that the process of step S5 is performed subsequent to the process of step S3.

Figure 6:
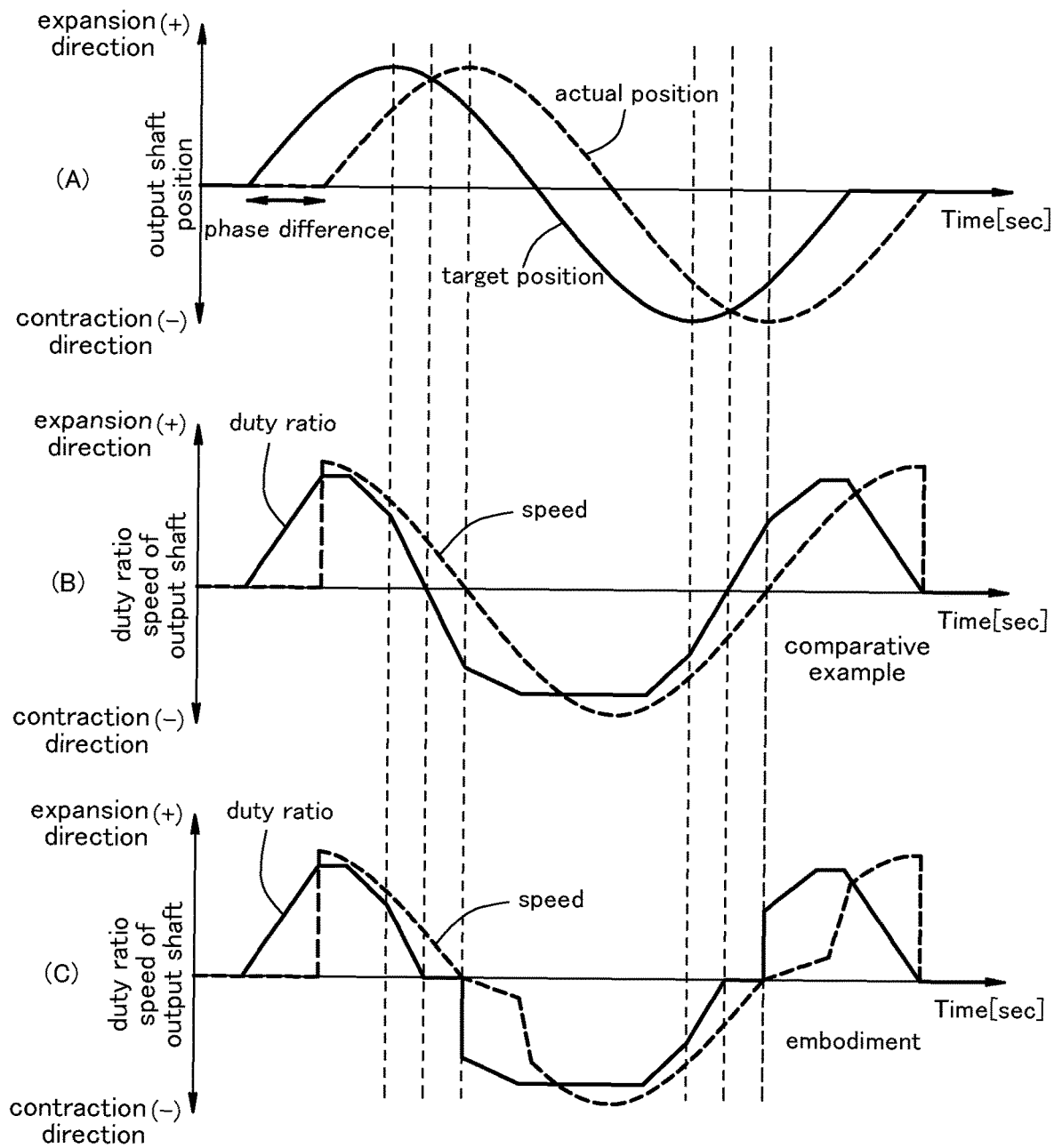

(A) of FIG. 6 is a graph showing a relationship between the target position and the actual position of the output shaft 29 when the vehicle travels a slalom course and the actuator 24 repeatedly undergoes expansion and contraction. When the controller 55 performs feedback control based on the difference between the target position and the actual position of the output shaft 29, a phase difference may be created between the target position and the actual position due to an influence of friction and inertia of the gear transmission mechanism 30. Specifically, when the direction of rotation of the drive gear 32 is reversed, first the speed of the drive gear 32 is reduced, and then, the speed of the driven gear 33 is reduced after a certain delay from the reduction of the speed of the drive gear 32. This results in a situation in which when the drive gear 32 starts rotating in the reverse direction, the driven gear 33 is still rotating in the pre-reversal direction. As shown in (B) of FIG. 6, in the toe angle control system 14 according to the comparative example, a period during which the sign of the duty ratio and the sign of the actual speed are opposite to each other occurs after the moving direction of the target position changes from the expansion direction to the contraction direction and before the moving direction of the actual position changes from the expansion direction to the contraction direction. Namely, a period during which the direction of rotation of the drive gear 32 and the direction of rotation of the driven gear 33 are opposite to each other. As a result, the teeth of the drive gear 32 and the teeth of the driven gear 33 collide against each other while moving at speeds in mutually opposite directions, whereby a relatively large rattling sound (tooth hitting noise) is generated. Similarly, a period during which the sign of the duty ratio and the sign of the actual speed are opposite to each other can also occur after the moving direction of the target position changes from the contraction direction to the expansion direction and before the moving direction of the actual position changes from the contraction direction to the expansion direction, and this can result in generation of a relatively large rattling sound.

(C) of FIG. 6 is a graph showing the duty ratio and the speed of the output shaft 29 in the toe angle control system 14 according to the embodiment when the vehicle speed is low (or the suppression gain is set to 0). The duty ratio shown in (C) of Figure is a duty ratio after correction (i.e., the second duty ratio). The toe angle control system 14 according to the embodiment determines whether the sign of the first duty ratio and the sign of the actual speed are opposite to each other (S4 in FIG. 5), and if the sign of the first duty ratio and the sign of the actual speed are opposite to each other, sets the suppression gain (S6 in FIG. 5), calculates the second duty ratio by reducing the first duty ratio using the suppression gain (S7 in FIG. 5), and controls the electric motor 28 in accordance with the second duty ratio (S8 in FIG. 5). Thereby, as shown in (C) of FIG. 6, it can be ensured that there is a time period sufficient for the speed of the output shaft 29 to be reduced before the teeth of the drive gear 32 and the teeth of the driven gear 33 collide against each other. Namely, when the speed of the drive gear 32 is reduced and the speed of the driven gear 33 is reduced following the reduction of the speed of the drive gear 32 with a delay, an increase of the speed of the drive gear 32 in the reverse direction is suppressed to ensure a time period sufficient for the speed of the driven gear 33 to be reduced before the gear teeth collision takes place. Consequently, when the teeth of the drive gear 32 and the teeth of the driven gear 33 collide against each other, the speed of the driven gear 33 can be reduced sufficiently. Thereby, the relative speed between the teeth of the drive gear 32 and the teeth of the driven gear 33 becomes small and the kinetic energy decreases at the time of collision. Therefore, the rattling sound generated by the collision between the teeth of the drive gear 32 and the teeth of the driven gear 33 can be reduced.

The toe angle control system 14 is configured to set the suppression gain depending on the vehicle speed, and therefore, it is possible to decrease the suppression gain to give priority to the suppression of the rattling sound when the vehicle speed is low, and to increase the suppression gain to give priority to the maintenance of the driving performance when the vehicle speed is high. When the vehicle speed is low, even if the displacement speed of the output shaft 29 (and hence, the response speed of the toe angle control system 14) is low, it has only a small influence on the driving performance, and the driver is not likely to be aware of the reduction of the driving performance. However, when the vehicle speed is low, the traveling sound of the vehicle is low, and therefore, the rattling sound can be easily perceived by the vehicle occupant. Therefore, when the vehicle speed is low, it is effective to decrease the suppression gain to suppress the rattling sound. On the other hand, when the vehicle speed is high, it is preferred that the displacement speed of the output shaft 29 (and hence, the response speed of the toe angle control system 14) is high in view of the driving performance. Also, when the vehicle speed is high, the traveling sound of the vehicle is large, and therefore, the rattling sound is perceived by the vehicle occupant less easily. Therefore, when the vehicle speed is high, it is effective to increase the suppression gain to maintain the driving performance.

Further, the actuator 24 of the toe angle control system 14 is supported by the rear cross member 6 that constitutes the sprung structure of the vehicle body. This contributes to reducing the unsprung mass to thereby improve the driving performance. As described above, the toe angle control system 14 can suppress generation of the rattling sound, and therefore, even if the toe angle control system 14 is provided on the rear cross member 6 which is located near the passenger compartment, the rattling sound is not perceived by the vehicle occupant easily.

A concrete embodiment of the present invention has been described in the foregoing, but the present invention is not limited to the embodiment and may be modified or altered in various ways. For example, in the foregoing embodiment, configuration was made such that the suppression gain was set to the first value or the second value depending on the vehicle speed, but it is also possible to gradually increase or decrease the suppression gain with the change of the vehicle speed.

Further, in the foregoing embodiment, the displacement direction of the output shaft 29 was determined based on the output of the gear angle sensor 48, but in another embodiment, the displacement direction of the output shaft 29 may be determined in any other appropriate method. For example, the actual position of the output shaft 29 varies with a certain delay relative to the target position, and therefore, it may be possible to estimate the speed of the output shaft 29 based on the first duty ratio a predetermined time before. Further, the sensor may consist of a sensor configured to detect the position of at least one of the output shaft 29, the knuckle 10, and the wheel supported by the knuckle 10. In addition, the sensor is not limited to the sensor that detects a state quantity related to the position of the output shaft 29, but may be a sensor that detects the torque applied on the wheel or the knuckle in the toe angle direction or a sensor that detects the torque of the electric motor.

The toe angle control system 14 according to the foregoing embodiment had a pair of left and right actuators 24 such that the left and right rear wheels can be steered independently, but in another embodiment, a single common actuator may be used to steer the both left and right rear wheels. Further, the toe angle control system may be provided to control the toe angles of the front wheels. The toe angle control system may steer the left and right front wheels independently or linked together.

The invention claimed is:

1. A toe angle control system for a vehicle, comprising:
an actuator having a housing, an electric motor supported by the housing, an output part supported so as to be capable of advancing and retreating relative to the housing, and a gear transmission mechanism provided inside the housing to transmit a driving force of the electric motor to the output part, the output part being connected to a knuckle via a connecting rod, and the knuckle supporting a wheel;
a sensor configured to detect a state quantity related to a position of the output part; and
a controller controlling the electric motor,
wherein a toe angle of the wheel is varied by the output part advancing and retreating relative to the housing, and
wherein the controller is configured to calculate a speed of the output part and a duty ratio of the electric motor, the speed of the output part and the duty ratio having positive and negative values corresponding to a direction of the advancing and retreating of the output part, and, when the controller determines that a sign of the speed of the output part and a sign of the duty ratio are opposite to each other, the controller corrects the duty ratio to reduce the duty ratio.

2. The toe angle control system according to claim 1, wherein the controller is configured to obtain the sign of the speed of the output part based on a signal from the sensor.

3. The toe angle control system according to claim 2, further comprising a vehicle speed sensor configured to detect a vehicle speed,
wherein the lower the vehicle speed is, the more the controller reduces the duty ratio when correcting the duty ratio.

4. The toe angle control system according to claim 3, wherein if the vehicle speed is equal to or lower than a predetermined determination value, the controller sets the duty ratio of the electric motor to zero when correcting the duty ratio.

5. The toe angle control system according to claim 2, wherein the controller calculates the duty ratio by feedback control based on a difference between a current position and a target position of the output part.

6. The toe angle control system according to claim 2, wherein the actuator is supported on a sprung structure of a vehicle body.

7. The toe angle control system according to claim 2, wherein the sensor is configured to detect a position of at least one of the output part, the knuckle connected to the output part, and the wheel supported by the knuckle.

\* \* \* \* \*